Oct. 15, 1968  A. SCARAVELLI  3,405,432
TUBE CLAMPING DEVICE

Filed March 15, 1967  2 Sheets-Sheet 1

INVENTOR
ANGELO SCARAVELLI
BY Steinberg & Blake
ATTORNEYS

Oct. 15, 1968 A. SCARAVELLI 3,405,432
TUBE CLAMPING DEVICE
Filed March 15, 1967 2 Sheets-Sheet 2

INVENTOR
ANGELO SCARAVELLI
BY Steinberg & Blake
ATTORNEYS

# United States Patent Office 3,405,432
Patented Oct. 15, 1968

3,405,432
TUBE CLAMPING DEVICE
Angelo Scaravelli, Viale Restelli 7, Milan, Italy
Filed Mar. 15, 1967, Ser. No. 623,316
Claims priority, application Italy, May 27, 1966,
18,372
2 Claims. (Cl. 24—274)

ABSTRACT OF THE DISCLOSURE

A hose clamp for clamping a flexible hose to a rigid tube. The clamping device is of the worm type and is secured to a perforated flexible band to tighten the latter about a hose. The device has a housing of arcuate configuration providing a seat for the worm having spirally arranged teeth for engaging selected perforations in an end portion of the band. This housing has a generally flat portion opposite the arcuate portion over which an end of the band passes and drawn thereagainst during tightening of the clamp. The flat portion has an outwardly turned portion disposed oppositely thereto and defining therewith a generally U-shaped cross section forming a recess to slide onto a desired end of the perforated band. This recess has teeth extending into the same from the outwardly turned portion to engage certain perforations so as to rigidly secure the housing to the selected band end.

---

This invention relates to a clamping device employing a metal clip, such as to provide a connection between a resilient or however flexible tube and a rigid tube.

Several types of clip devices are known, in which the clip is made of various materials and according to different shapes and conceptions.

All known devices substantially suffer from the same drawbacks, one of which is that said devices have to be made with clips of a different length; in other terms, since by a device it is possible to provide a clamping for tubes having diameters within comparatively narrow ranges, it will be necessary for a dealer and a manufacturer to stock and manufacture a numerous series of devices provided with clips of a different length.

A further disadvantage of known clip devices is to cause a certain waste of material when, with only a device having a high length clip, elements of smaller circumferential dimensions are to be tightened to one another.

The object of the invention is to provide a clamping device by which the above-mentioned drawbacks are completely removed, in that the clip is obtained by a web roll according to the length time by time being required.

In order to attain said objects the clamping device having a clip provided with openings, with which a screw member engages, is characterized in that an end of the clip is restrained through the openings thereof to a guiding body for a slide carrying a threaded element engaging with its thread with openings in the clip length interposed between the body and slide.

The present invention will be better understood from the following detailed description, given by way of non-restrictive example, reference being made to the figures of the accompanying drawing, in which.

Figure 1:
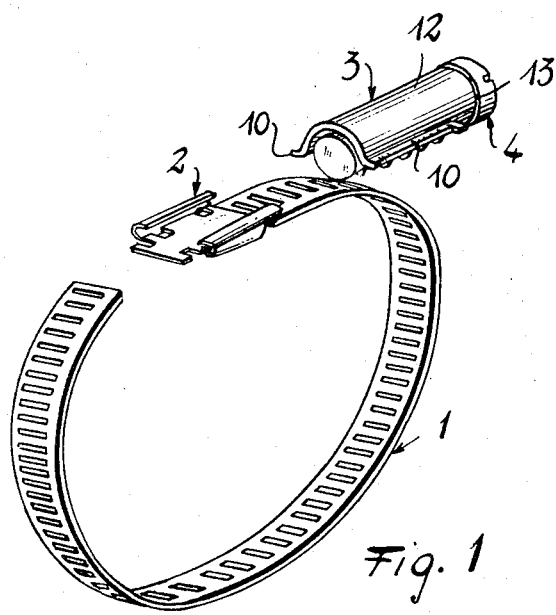
FIG. 1 is a perspective view of all the elements making up the device according to the invention.
Figures 2, 3:
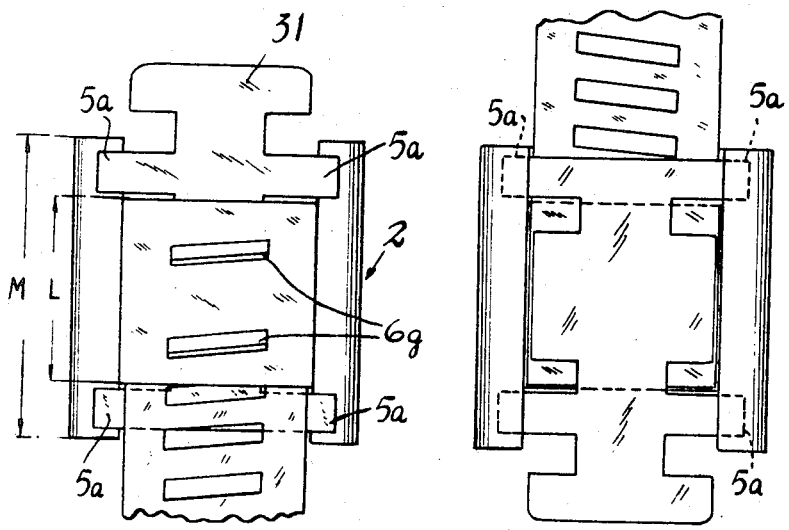
FIG. 2 is an enlarged bottom view of the element which can be clamped to the end of the web forming the clip.
FIG. 3 is a top view of the element in FIG. 2.
Figure 4:
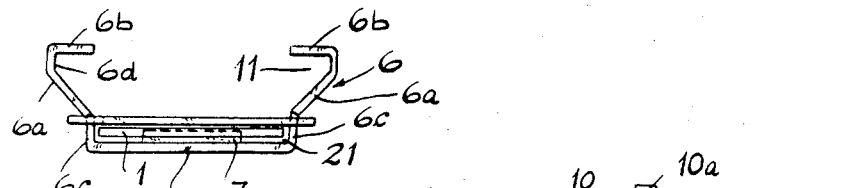
FIG. 4 is a front view of the element shown in FIGS. 2 and 3.

From a roll of preferably metal web 1, provided with evenly spaced oblique openings, designated at 8, of a high and however indefinite length, a convenient length of web is unrolled, and a guiding element 2, formed of two portions 5 and 6, is applied and firmly secured to an end of said web 1 (only a length of which is shown in FIG. 1). Portion 6 is of a substantially U shape (see FIG. 4), the legs of which are substantially parallel for a length 6c, then outward inclined at 6a, and finally inward inclined at 6b, with a transition zone at 6d. As better understood hereinafter, two facing guides 11 are thus formed, into which the guiding flanges 10 of the slide, indicated as a whole at 3, are introduced. Portion 6 has a bottom 6f, the length L of which (see FIG. 2) is less than the maximum length M of portion 6; the parallel sections 6c of the sides of portion 6 are also of a length L.

Within bottom 6f two oblique slots 6g are provided, said slots being located at a mutual distance equal to the distance, or a multiple thereof, between two oblique slots 8 of web 1. Slots 6g are provided by folding up the material of bottom 6f at the corresponding points, thus obtaining a pair of teeth 7 designed to enter openings 8 of web 1 when the latter is end inserted in channel 21 defined by base 6f, side sections 6c and plate 5 forming the other portions of the guiding element 2. Advantageously, the longitudinals section of channel 21 converges from the side where the end of clip 1 is introduced.

Plate 5 is secured to portion 6 by means of a pair of projecting flanges 5a at each of the ends thereof, said flanges being of a width larger than that of base 6f for portion 6 and located intermediately between M and L. Connection between portions 5 and 6 may occur, for example, by bending of flanges 5a and subsequent flattening thereof when in place.

Figure 5:
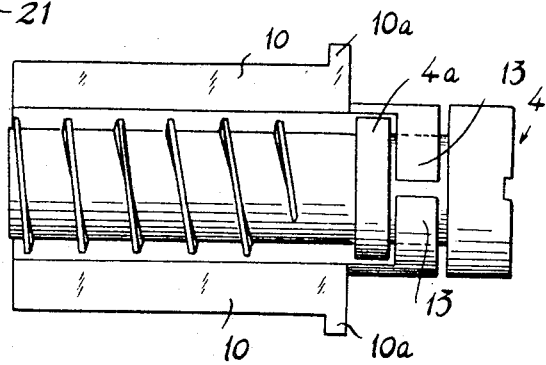
FIG. 5 is a bottom view of the clamping slide.

The device is completed by slide 3, comprising a substantially semicircular housing 12 provided with flanges 10 having pawls 10a at one end thereof. Furthermore, housing 12 has two sections 13 circularly bent (see FIG. 5) and acting as a collar within which a threaded element 4 is rotatable, however without being axially displaceable, the pitch of the thread for said threaded element 4 being coincident with that for slots 8 of web 1. The collar is fitted into a groove defined on one side by the head of the threaded element 4, and on the other side by an annular projection 4a on the shank of said threaded element.

Clamping of web ends is carried out as follows:

The free end of the web is inserted in channel 21 until teeth 7 enter two slots 8 of said web. Preferably, teeth 7 will be slightly inclined in web introducing direction, so that the web is entangled. As shown in FIG. 1, the other end of the clip is arranged above plate 5, or the remaining of the not yet measure-cut web is caused to pass. Slide 3 is then slipped within guides 21, said slide 3 engaging with the thread of its threaded element into openings 8, whereby, by rotating the threaded element, clip clamping and side advancement are achieved until pawls 10a are against the ends of guides 11. The unused portion of the web is then cut.

Particularly, when inserted in guides 11, slide 3 may exert a slight pressure against plate 5 to prevent any separation of clip end from teeth 7.

At 31 there is indicated an extension of plate 5, acting to facilitate the location of the side wherein the free end of web 1 is to be inserted.

It will be apparent that the problem of stocking supplies according to the various possibly requested sizes is eliminated by the present device, being it sufficient to stock web rolls and a series of elements 2 and 3 separated to each other, which will combined only on occurrence of use thereof.

Figure 6:
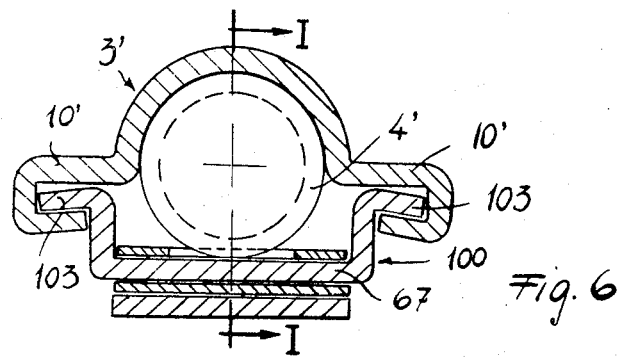
FIG. 6 is a front view of the element for clamping the clip ends according to a modified embodiment.
Figure 7:
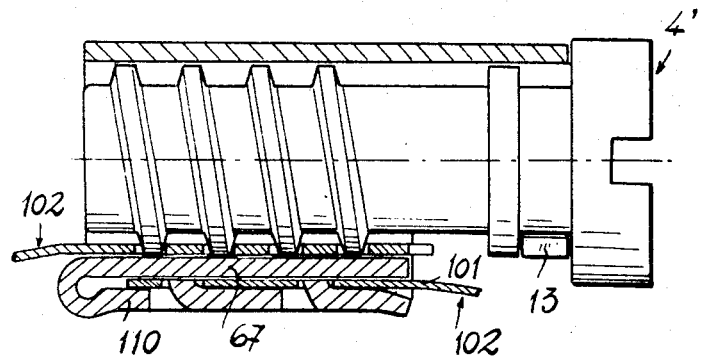
FIG. 7 is a sectional view taken on line I—I for the element in FIG. 6.

Element 2, which may be secured to the ends of a web length, is in the preferred embodiment formed of two separate parts 5 and 6, but evidently any type of element having substantially the form of element 2 is suitable to operate in accordance with requirements and indeed, as shown in FIGS. 6 and 7, element 100, which may be secured to the free end 101 of the web length 102, is integral and has a flanged U-structural shape or channel with outwardly bent ends 103, which are embraced by hook-like bendings at the ends of the guiding flanges 10' of slide 3'. Base 6'f of element 100 extends by an extension 110, which is bent through 180° (see FIG. 7), that is parallel to the remainder of the base, and by inward bending, teeth 7' equivalent to teeth 7 of the prior embodiment are provided in said extension. To indicate in the embodiments of FIGS. 6 and 7 those parts which are like or similar to the parts of the prior embodiment, the same reference numerals have been used, when possible, but with primes.

Other variations, not shown in the figures, are possible, such as a variation contemplating element 3 sidewise pivoted to element 2, the latter being provided with interblocking means for said two elements subsequently to insertion of the other end of the web therebetween.

Although preferred embodiments of the present invention have been shown and described, all possible variations which will be apparent to those skilled in the art are intended as within the scope thereof.

I claim:

1. A hose clamp comprising a flexible band formed with a series of longitudinally spaced apertures formed therein and adapted to be engaged by a worm tightening means suitably secured thereto by suitable means so that the band can be formed into a hose clamp, said means comprising a general U-shaped housing having laterally extending flanges adapted to engage a general C-shaped member secured to one end of the flexible band and providing in turn flanges adapted to matingly engage the flanges on the said U-shaped housing, said housing when secured together being adapted to receive a tightening worm having spirally arranged teeth thereon adapted to engage apertures formed in the other end portion of the flexible band to draw the ends of the band towards each other to tighten same, said generally C-shaped housing having a guide member with laterally projecting longitudinally spaced flanges adapted to cooperate with portions of the generally C-shaped housing, said guide member flanges being of greater length than the width of the strap so that said one end of the strap can be placed within the generally C-shaped housing and the said guide member can be placed thereon with its laterally extending flanges bent over opposite end portions of the C-shaped housing so as to rigidly secure the said one end to the C-shaped housing.

2. A clamping device of the worm type adapted to be secured to a perforated flexible band so as to tighten the band about a hose, said device comprising a housing having a central portion of longitudinally extending arcuate configuration adapted to provide a seat for the associating worm having spirally arranged teeth adapted to engage the selected perforations in an end portion of the band, said housing having a generally flat portion opposite the arcuate portion and adapted to have an end of the band passed thereover and drawn thereagainst during the tightening of the clamp, said flat portion having an outwardly turned portion disposed oppositely thereto and forming therewith a generally U-shaped cross section and providing therewith a recess adapted to be slid onto a desired end of the perforated band, said recess having teeth extending thereinto from the outwardly turned portion adapted to engage certain of said perforations to rigidly secure the housing to the selected band end.

References Cited
UNITED STATES PATENTS

| | | | |
|---|---|---|---|
| 2,767,455 | 10/1956 | Schaefer | 24—274 |
| 3,087,220 | 4/1963 | Tinsley | 24—274 |
| 3,162,921 | 12/1964 | Cheris | 24—274 |
| 3,254,387 | 6/1966 | Smith | 24—279 |

DONALD A. GRIFFIN, *Primary Examiner.*